Dec. 6, 1955  W. D. TODHUNTER  2,725,629
SURGICAL DISSECTION SCISSORS
Filed Oct. 4, 1954  2 Sheets-Sheet 1
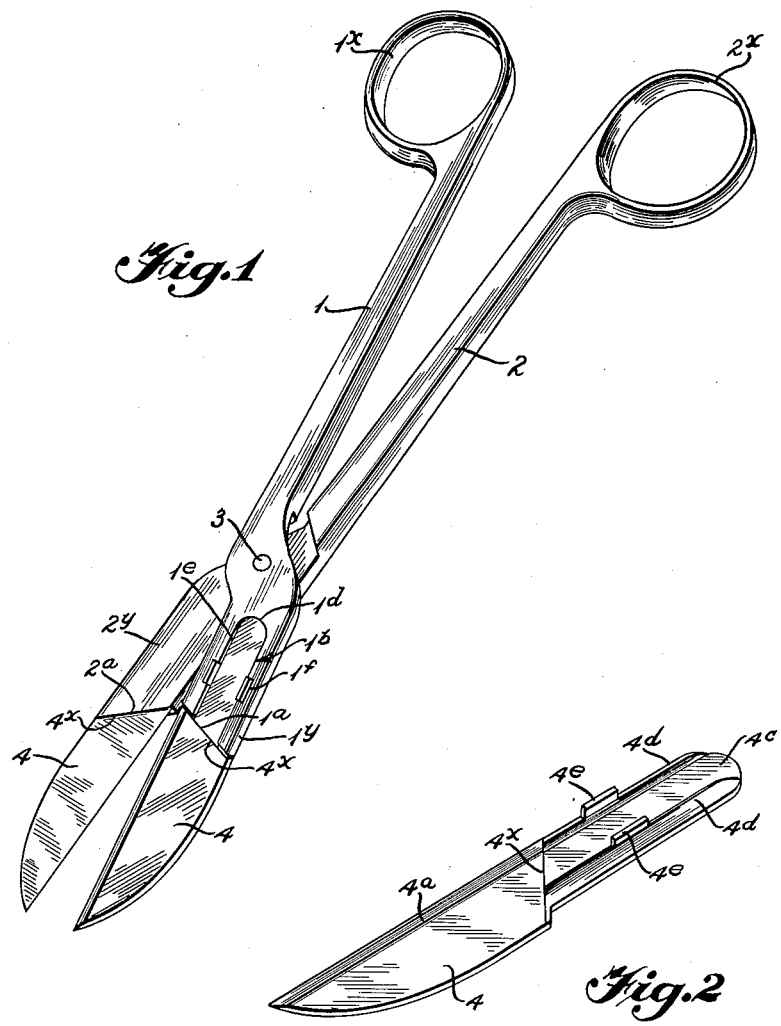
INVENTOR
William D. Todhunter
BY
ATTORNEYS Dec. 6, 1955   W. D. TODHUNTER   2,725,629
SURGICAL DISSECTION SCISSORS
Filed Oct. 4, 1954   2 Sheets-Sheet 2
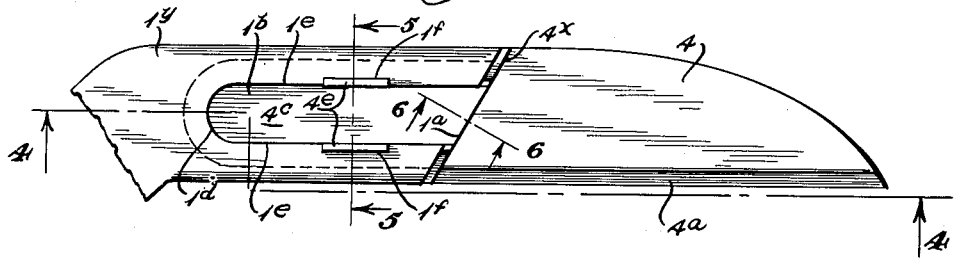
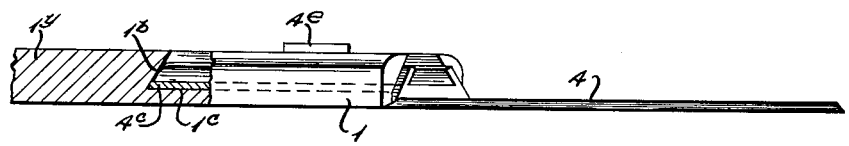
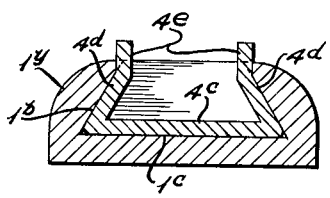 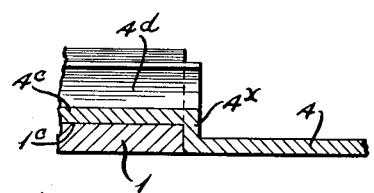
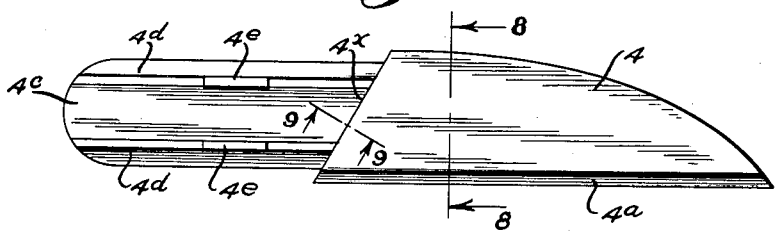
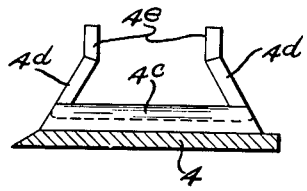
INVENTOR
William D. Todhunter
BY
ATTORNEYS

United States Patent Office 2,725,629
Patented Dec. 6, 1955

2,725,629

SURGICAL DISSECTION SCISSORS

William D. Todhunter, Williamsport, Pa.

Application October 4, 1954, Serial No. 460,080

8 Claims. (Cl. 30—260)

This invention is a novel improvement in surgical instruments simulating dissecting scissors and designed to function as such, my novel instrument being provided with detachable and/or removable blades to offer surgeons or the like an economic, sharp instrument in which dulled blades may be removed or replaced at the operating room table rather than necessitating that the same be sent away for the express purpose of sharpening the blades.

Other minor objects of the invention will be hereinafter set forth.

I will explain the invention with reference to the accompanying drawings, which illustrate one practical embodiment thereof, to enable others familiar with the art to adopt and use the same; and will summarize in the claims the novel features of construction, and novel combinations of parts, for which protection is desired.

In said drawings:

Figure 1 is a perspective view of my novel instrument.

Fig. 2 is a perspective view of one of the removable blades used in said instrument, detached.

Fig. 3 is an enlarged plan view of a removable blade mounted in the adjacent portion of the scissors arm or shank.

Fig. 4 is a longitudinal section on the line 4—4, Fig. 3.

Fig. 5 is an enlarged transverse section on the line 5—5, Fig. 3.

Fig. 6 is an enlarged section on the line 6—6, Fig. 3.

Fig. 7 is a top plan view of one of the blades, detached.

Fig. 8 is an enlarged transverse section on the line 8—8, Fig. 7.

Fig. 9 is an enlarged section on the line 9—9, Fig. 7.

As shown, my novel surgical instrument is of the general scissors type, the same comprising cross arms 1 and 2 which are pivoted together intermediate their ends, as at 3, the outer ends of the arms carrying finger loops 1x and 2x respectively in the usual manner. The opposite ends of the arms 1 and 2 extend somewhat beyond the pivot 3 to provide shanks 1y and 2y which have outer ends cut off at angles 1a and 2a respectively, preferably inclined at angles substantially 30 degrees from the axes of the arms 1 and 2 respectively, so that the outer edges of the arm shanks 1y and 2y below the pivot 3 are longer than the inner edges thereof.

As shown in Fig. 4, the shanks 1y and 2y of the arms 1 and 2 are of substantial thickness and width; and extending inwardly from the end 1a of the shank 1y in the upper face of the shank is an undercut slot 1b, which is open at the upper face of the shank 1y, said slot 1b extending from the end 1a towards and terminating below pivot 3. The base 1c of slot 1b terminates adjacent the opposite or lower face of the shank 1y, and preferably the inner end of slot 1b is rounded as at 1d. The open face of slot 1b is bound by parallel walls 1e (Fig. 3) said walls 1e being provided adjacent their midpoints with opposed rectangular recesses 1f (Fig. 3) for the purpose hereinafter explained, the slot 1b being open at the beveled end 1a of the shank 1y.

The slot 1b is adapted to receive the tongue 4c of a removable blade 4, shown more particularly in Figs. 2, 7, 8 and 9. As shown, the removable blade 4 is sharpened along the cutting edge 4a in the usual manner, and is provided at one end with the tongue 4c of width adapted to fit the base 1c of slot 1b, the same making a snug sliding fit therein. The tongue 4c is formed of flexible metal, and side edges of tongue 4c are flanged upwardly as at 4d, the same converging to conform with the undercut side portions of slot 1b, as shown in Fig. 5. The flanges 4d terminates adjacent the open top of slot 1b, and are provided with opposed upstanding parallel lugs 4e adapted to snap into the opposed recesses 1f in the top side walls 1e of slot 1b, as shown in Fig. 3, thereby normally locking the tongue 4c in slot 1b but permitting tongue 4c to be removed from slot 1b when the lugs 4e are squeezed together sufficiently to free the recesses 1f, the metal flanges 4d being sufficiently resilient to permit such squeezing together of the lugs.

As shown, the tongue 4c is offset from the plane of the blade 4, as at 4x, a distance equal to the distance from the base 1c of slot 1b to the lower face of the blade 4 so that the lower face of the blade 4 will form a substantial continuation of the lower face of the shank 1y upon which it is mounted.

In the shank 2y of the opposite leg 2 is a slot similar in all respects to slot 1b in shank 1y, and adapted to receive a tongue of a blade which is similar to, in all respects, but complementary to the blade 4 carried by the shank 1y, and therefore the blade carried by shank 2y needs no particular description herein, the blades 4 forming removable cutting tips of the instrument in the nature of surgical or dissecting scissors.

My invention provides an instrument of the above type in which the blades 4 may be removed and placed at the operating room table or any other convenient location, dispensing with the necessity of having to send the scissors away for sharpening.

The device consists of the arms 1 and 2 provided with finger holds 1x and 2x, the arms being pivoted together at 3 to maintain a permanent relationship between the two arms, and the shanks 1y and 2y of the arms being designed to hold removable sharp blades. The ends of the shanks are cut as at 1a—2a at an angle of approximately 30 degrees so that the outer sides of the shanks are longer than the inner or cutting sides. The angled end of each shank is milled so that it is hollow with the outer flat surface unroofed. The milled portion has a wide base and a narrow opening on the outer flat surface of the shank.

The blades for insertion in the previously described shanks may have either curved or straight cutting edges. The cutting portion is in direct continuity with the attaching portion. The attaching portion is elevated from the flat cutting surface of the blade in order to let the blade continue flush with the inner or cutting surface of the scissor shank. The attaching portion is shaped to fit snugly into the milled end of the scissor shank.

I do not limit my invention to the exact form shown in the drawings, for obviously changes may be made therein within the scope of the claims.

I claim:

1. In a surgical instrument having a blade holding shank, an open faced undercut slot in one face of the shank bounded by parallel edges provided adjacent their mid-points with opposed recesses; said slot extending to the end of the shank; a blade having a flexible U-shaped tongue slidably disposed in said slot, said tongue being of same cross-sectional shape as said slot and having opposed lugs on its sides adapted to normally yieldably engage the said opposed recesses whereby when said lugs when squeezed together the same will disengage the recesses, permitting the blade to be withdrawn from the slot.

2. In an instrument as set forth in claim 1, the inner ends of the blade being offset from said tongue a distance substantially equal to the distance of the bottom of the slot from the opposite face of the shank.

3. A surgical instrument of the scissors type having cross arms pivoted together intermediate their ends, said arms having shanks at one end; open faced undercut slots in the outer faces of the shanks bounded by parallel edges provided adjacent their mid-points with opposed recesses; said slots extending to the outer ends of the shanks; blades having resilient U-shaped tongues slidably disposed in said slots, said tongues being of same cross-sectional shapes as said slots and having opposed lugs on its sides adapted to normally yieldably engage the said opposed recesses whereby when said lugs when squeezed together the same will disengage the recesses, permitting the blades to be withdrawn from the slots.

4. In an instrument as set forth in claim 3, the inner ends of the blades being offset from said tongues a distance substantially equal to the distance of the bottoms of the slots from the inner faces of the shanks.

5. A surgical instrument of the scissors type having cross arms pivoted together intermediate their ends, said arms having shanks at one end, the outer ends of the shanks being inclined at angles to the axes thereof whereby the outer edges of the shanks are longer than their inner edges; open faced undercut slots in the outer faces of the shanks bounded by parallel edges provided adjacent their mid-points with opposed recesses; said slots extending to the inclined ends of the shanks; blades having resilient U-shaped tongues slidably disposed in said slots, said tongues being of same cross-sectional shapes as said slots and having opposed lugs on its sides adapted to normally yieldably engage the said opposed recesses whereby when said lugs when squeezed together the same will disengage the recesses, permitting the blades to be withdrawn from the slots.

6. In an instrument as set forth in claim 5, the inner ends of the blades being inclined the same as and engaging the outer inclined ends of the shanks.

7. In an instrument as set forth in claim 5, the inner ends of the blades being offset from said tongues a distance substantially equal to the distance of the bottom of the slots from the inner faces of the shanks.

8. In an instrument as set forth in claim 7, the inner ends of the blades being inclined the same as and engaging the outer inclined ends of the shanks.

No references cited.